July 16, 1963 L. HORN ET AL 3,097,975
SEPARATOR FOR ELECTRIC BATTERIES
Filed May 17, 1960

INVENTORS
Lutz Horn and
Fritz Philipp
BY
Michael S. Striker
Attorney

United States Patent Office 3,097,975
Patented July 16, 1963

3,097,975
SEPARATOR FOR ELECTRIC BATTERIES
Lutz Horn, Hagen, Westphalia, and Fritz Philipp, Hagen-Haspe, Germany, assignors to Varta Aktiengesellschaft, a corporation of Germany
Filed May 17, 1960, Ser. No. 29,635
2 Claims. (Cl. 136—145)

The present invention relates to a separator for electric batteries, and, more particularly, the present invention relates to a separator for use in galvanic cells, for instance primary cells with neutral electrolytes such as ammonium chloride, magnesium chloride or zinc chloride, and in alkaline storage batteries.

Up to now, such separators were sometimes made of synthetic fabrics woven or knitted of straight, smooth fibers and threads. While such separators when produced of suitable synthetic material, possess the desired resistance against chemical attack by the electrolyte and also can be produced with the desired mechanical strength characteristics, certain disadvantages of such separators could not be overcome. Particularly, the interstices between the woven threads could not be made sufficiently small to prevent the danger of short circuits within the battery cell. For instance, in compact batteries in which the electrode plates with the separator interposed therebetween are pressed tightly together, active mass from one or the other of the adjacent electrode plates of opposite polarities frequently displays a tendency to grow through interstices of the separator and thus to contact the electrode of opposite polarity. Furthermore, the absorptive capacity of such separators and thus their ability to retain electrolyte is relatively small.

It is therefore an object of the present invention to overcome the above-discussed disadvantages.

It is a further object of the present invention to provide a separator for electric batteries which can be produced in a simple and economical manner and will be capable of absorbing relatively large quantities of electrolyte while at the same time preventing the active masses of the electrodes from penetrating the separator to an appreciable extent.

Other objects and advantages of the present invention will become apparent from a further reading of the description of the appended claims.

With the above and other objects in view, the present invention contemplates in a storage battery of the type described, in combination, a separator consisting of crimped, synthetic, electrolyte-resistant fibers.

The separator according to the present invention, for use in cells with neutral or alkaline electrolyte, will be produced of a synthetic material which is chemically resistant against the electrolyte. Polyamides have been found to be particularly suitable for this purpose but other synthetic materials which will not be attacked by the electrolyte also may be used.

Crimped fibers as well as threads and fabrics made therefrom have found useful application for instance in the manufacture of stockings, and the manufacture of crimped textiles, particularly in connection with certain items of wearing apparel has been described in great detail in the recent patent literature and in certain journals such as the British "Man-Made Textiles."

Surprisingly, it has been found that separator structures formed of fabrics or fleece made of crimped fibers will be capable of retaining larger quantities of electrolyte than was hitherto possible, will prevent "growing through" of active mass, will possess the desired mechanical strength, and will have a very low electric resistance, so that batteries including the new separator will not be subject to the difficulties and disadvantages discussed above.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
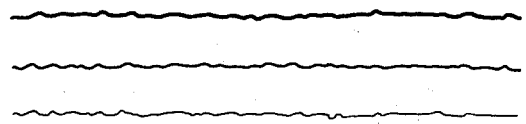
FIG. 1 illustrates crimped synthetic fibers.
Figure 2:
FIG. 2 shows a yarn or thread formed of fibers such as illustrated in FIG. 1.
Figure 3:
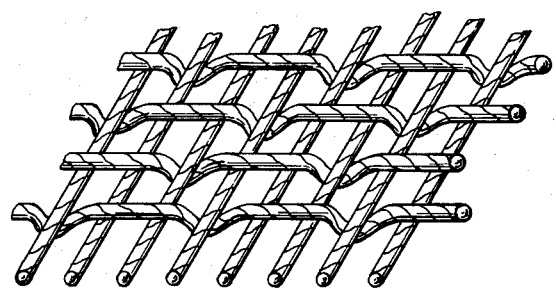
Figure 4:
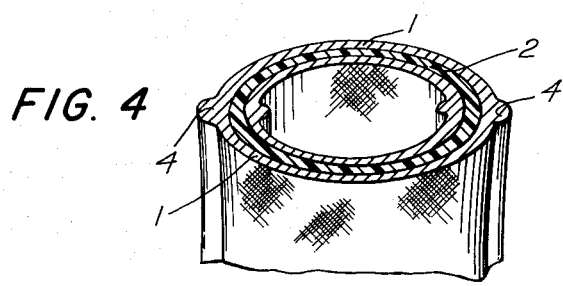

FIG. 3 is a perspective schematic view of a linen-type or satin-type weave such as has been found particularly suitable for separators according to the present invention; and FIG. 4 is a perspective view of a composite tubular separator structure according to the present invention formed for instance of a fabric weave such as illustrated in FIG. 3 and showing reinforcing woven edges 4 extending in the direction of the warp threads, as a further safeguard against penetration of the separator by uneven portions of the electrodes, particularly, the metallic electrode framework.

Contrary to fabrics made of straight fibers and smooth threads in which the interstices between the individual threads will be of considerable size, even if several fabric layers are superposed, the fabric or fleece according to the present invention will be formed with very small interstices and will possess a very high absorptive capacity. This is due to the fact that, according to the present invention, the separator sheet is made of crimped fibers and thus will be formed with a great number of interstices of capillary dimensions. This will permit absorption of a very large quantity of electrolyte, particularly, since the threads of the fabrics used according to the present invention have the tendency to loosen or "burst" after weaving and thus to fill the entire area of the fabric with a more or less homogeneous crimped fiber mass with interstices of capillary dimensions therebetween. Consequently, such fabrics are considerably denser and possess greater absorptive capacity than fabrics of similar weight and structure but produced of uncrimped fibers.

Separators consisting, according to the present invention, of crimped fibers are capable of withstanding also the more severe mechanical stress to which separators are exposed in the assembly of wound or coiled electrodes.

According to a preferred embodiment of the present invention, a pulverulent, electrolyte-resistant material is applied to the separator fabric for instance by dusting or while suspended in a liquid which subsequently is removed. The pulverulent material, such as aluminum oxide or magnesium oxide serves for increasing the density of the separator structure, for reducing the size of the interstices therein and thus for increasing capillary action so that the adherence of the electrolyte to the separator is improved.

In addition to aluminum and magnesium oxide, barium hydroxide and strontium hydroxide have also been found particularly suitable for increasing the density of the separator.

The particle size of the impregnating material such as aluminum oxide is preferably between 3 and 10 microns and very good results were obtained by incorporating into the separator particles having a size of approximately 5 microns.

The separator according to the present invention may consist of either a fabric or a fleece produced of crimped fibers. Generally, fabrics are preferred because size and distribution of the interstices can be more easily controlled in fabrics than in an haphazard fleece arrangement. Pore diameters of the separator may be, and preferably are, within the range of about 20–30 microns.

According to another preferred embodiment, the separator according to the present invention consists of a plurality of superposed fabric or fleece sheets produced of crimped fibers. Thereby, the quantity of electrolyte which can be absorbed is increased without a substantial increase in the electrical resistance of the separator. In addition, the resistance of such composite separator against penetration by active mass is further improved.

According to yet another preferred embodiment of the present invention, and as illustrated in FIG. 4, the separator consists of a plurality of fabric sheets 1 with an interposed foil of ion-permeable, fluid-impermeable material such as a polyvinyl alcohol, regenerated cellulose or cellulose triacetate. The thickness of the semi-permeable foil is kept as low as possible, preferably between about 30 and 50 microns in order to keep the inner resistance of the cell as low as possible.

Separators according to the last described embodiment possess the particular advantage that they are ion-permeable but gas-impermeable so that, for instance in hermetically sealed alkaline batteries, gases developed during operation of such batteries will not pass through the separator and thus will not come in contact with those portions of the opposite electrode which primarily serve for producing electric current. Due to the gas-impermeable separator structure, the gases will be forced to collect in the gas space provided for this purpose and will be taken up by exposed electrode portions extending into the gas space.

When pressure is exerted during assembly of the cell, the separator fabric will become even more dense and thereby its absorptivity and electric resistance will be improved, the danger of internal short circuits will be further reduced and the useful life span of the cell will be increased.

The separator of the present invention may be produced in the form of a tubular fabric consisting of crimped polyamide fibers, such as is known under the trade name "Ban-Lon." The inner width of the flattened tube, when destined for surrounding a plate of two millimeter thickness, may be between 49 and 51 mm. The warp threads of the fabric may consist of 140 denier "Ban-Lon," double threads with 150 torsions per meter with 70 x 2 warp threads per centimeter. The weft threads may be 140 x 2 denier, with torsion of the weft threads, with 33 weft threads per centimeter. The weight per meter of the above-described tubular fabric will be between 22 and 23.5 grams.

Preferably, the longitudinal edges of the flattened tubular fabric will be reinforced, while the main surface portion between the reinforced edges will be fluffed. A fluffed surface of the separator will be particularly well suited for holding back graphite when the positive electrode is to be well insulated. Graphite from the positive electrode will be gripped in the fluffy surface of the separator facing the positive electrode and thus will be prevented from growing through the separator.

Either one or both faces of the separator fabric may be fluffed. For instance, a linen weave could be employed having one unfluffed face and having the other face fluffed by brushing. In such case, the fluffed surface is preferably arranged so as to face the positive electrode.

It will be understood that each of the elements described above, or two or more together, may also find a useful application in other types of separators differing from the types described above.

While the invention has been illustrated and described as embodied in a separator for electric cells, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a storage battery of the type described, in combination, a separator consisting essentially of a plurality of superposed sheets consisting of crimped electrolyte-resistant polyamide fibers; and an ion-permeable fluid-impermeable foil interposed between and contacting at least two of said plurality of sheets.

2. In a storage battery of the type described, in combination, a separator consisting essentially of a plurality of superposed sheets consisting of crimped electrolyte-resistant polyamide fibers; and an ion-permeable fluid-impermeable foil interposed between and contacting at least two of said plurality of sheets, said foil being formed of a substance selected from the group consisting of regenerated cellulose, cellulose triacetate and polyvinyl alcohol.

References Cited in the file of this patent

UNITED STATES PATENTS

| | | |
|---|---|---|
| 2,168,366 | Slayter | Aug. 8, 1939 |
| 2,478,186 | Gerber | Aug. 9, 1949 |
| 2,745,893 | Chubb et al. | May 15, 1956 |
| 2,937,221 | Lindgren | May 17, 1960 |
| 2,942,057 | Huber et al. | June 21, 1960 |
| 2,970,181 | Corren | Jan. 31, 1961 |
| 2,981,783 | Bushrod | Apr. 25, 1961 |

FOREIGN PATENTS

| | | |
|---|---|---|
| 475,464 | Great Britain | Nov. 19, 1937 |
| 537,377 | Great Britain | June 19, 1941 |
| 700,934 | Great Britain | Dec. 16, 1953 |
| 763,866 | France | Feb. 14, 1934 |